United States Patent [19]

Blankenship et al.

[11] Patent Number: 6,137,081

[45] Date of Patent: Oct. 24, 2000

[54] ELECTRODE AND METHOD OF MAKING SAME

[75] Inventors: George D. Blankenship, Chardon; Edward A. Enyedy, Eastlake, both of Ohio

[73] Assignee: Lincoln Global, Inc., Cleveland, Ohio

[21] Appl. No.: 09/368,939

[22] Filed: Aug. 5, 1999

Related U.S. Application Data

[63] Continuation of application No. 09/024,392, Feb. 17, 1998, abandoned.

[51] Int. Cl.$^7$ .................................................... B23K 35/02
[52] U.S. Cl. ................ 219/145.1; 219/136; 219/145.31; 219/76.14; 219/145.23
[58] Field of Search ............................. 219/145.1, 125.1, 219/121.11, 136, 137 R, 137.2, 137 WM, 145.23, 146.1, 146.3, 76.14, 145.31

[56] References Cited

U.S. PATENT DOCUMENTS

| | | |
|---|---|---|
| 1,354,664 | 10/1920 | Knoll et al. . |
| 1,835,899 | 12/1931 | Rode . |
| 1,940,573 | 12/1933 | Austin ........................................... 219/8 |
| 3,620,830 | 11/1971 | Kramer ..................................... 117/204 |
| 3,691,340 | 9/1972 | Landis et al. ............................ 219/146 |
| 3,843,867 | 10/1974 | Helton et al. ............................ 219/137 |
| 4,072,845 | 2/1978 | Buckingham et al. ............... 219/146.3 |
| 4,864,093 | 9/1989 | Henderson et al. ....................... 219/70 |

FOREIGN PATENT DOCUMENTS

| | | |
|---|---|---|
| 1565430 | 2/1970 | Germany . |
| 92/03251 | 3/1992 | WIPO ............................ B23K 35/04 |
| WO 92/03251 | 3/1992 | WIPO . |

*Primary Examiner*—Patrick Ryan
*Assistant Examiner*—M. Alexandra Elve
*Attorney, Agent, or Firm*—Vickers, Daniels & Young

[57] ABSTRACT

A welding wire for use in electric arc welding and method of making same, wherein the wire has an effective outer diameter and comprises a length of solid metal formed into a series of distinct segments each having a selected volume and having a narrow region and non-narrow region with the cross sectional area of the solid metal at said non-narrow region being greater than the cross sectional area of the solid metal at the narrow region.

53 Claims, 4 Drawing Sheets

ELECTRODE AND METHOD OF MAKING SAME

This U.S. patent application is a continuation-in-part of U.S. patent application Ser. No. 09/024,392 filed Feb. 17, 1998 abandoned.

The present invention relates to the art of electric arc welding of the type where a welding wire is directed toward a workpiece and an electrical current is passed through the welding wire to the workpiece to create an arc welding process melting the end of the advancing wire and depositing the melted metal onto the workpiece and more particularly to an improved welding wire for use in this arc welding process and the method of making this improved welding wire.

INCORPORATION BY REFERENCE

U.S. patent application Ser. No. 024,392 filed Feb. 17, 1998 is incorporated by reference herein to provide information on solid metal welding wire which has distinct quantized segments that facilitate superior droplet transfer.

BACKGROUND OF INVENTION

Electric arc welding of the type to which the present invention is directed involves the use of a welding wire normally stored upon a spool or reel, which wire is fed from the supply reel toward a workpiece through a tubular connector so that current can be directed through the connector to the advancing welding wire and through the welding wire to the workpiece. The electric current heats the advancing welding wire by $I^2R$ heating so that the end of the welding wire is melted and deposited onto the workpiece by transfer through the arc or by other electrical and mechanical phenomenon. Thus, the advancing wire conducts the welding current which melts the wire for deposition of the molten metal from the end of the wire onto the workpiece. Through the years there have been substantial improvements in the welding wire, which is normally a solid wire having a predetermined diameter and a surface lubricant so the wire can be advanced at a controlled feed speed for melting and depositing the molten metal onto the workpiece. Shielding gas can be used around the advancing welding wire. A solid wire provides superior arc welding properties; however, it is often necessary to provide the welding wire with flux and alloying metal ingredients to tailor the molten metal deposition to the desired metallurgical demands of the welding process. To accomplish these added features, it has become common practice to form the wire as a steel sheath surrounding a center core formed from fluxing ingredients and/or alloying powder. Thus, there are many cored welding wires. By using a cored wire concept, the flux can be evenly distributed along the length of the advancing welding wire. When producing the metal sheath from a somewhat standard steel, the core can include alloying powder. These metal cored electrodes employ the powdered metal in the core to tailor the deposited metal for a given welding process. There is a substantial advantage in some welding processes to use the flux cored or metal cored wire. Indeed, there are instances when a combination flux and alloy powder are used in the core of the wire. The advantages of these cored wires or electrodes for arc welding wire are somewhat offset by the fact that a solid metal wire normally produces superior arc welding. The metal is at the center of the arc and in a sheath surrounding the arc, as in a flux cored or metal cored wire. Both a solid metal wire and a metal cored wire have a substantially constant resistance per length of wire, which resistance controls the arc welding process especially in constant voltage arc welding procedures. In some arc welding processes, it is desirable to have an increased resistance per length to optimize the welding process, but such a modification affects the amount of metal being deposited. The solid metal wire and the cored metal wire satisfy the demands of the electric arc welding industry; however, they have disadvantages caused by the constraints of their physical characteristics which in some instances does not allow optimum electrical characteristics of the welding process.

THE INVENTION

The present invention is a solid metal welding wire which has distinct quantized segments that facilitate superior droplet transfer. The segments each have essentially the same volume. This use of a solid welding wire with quantized distinct segments has been found to perform well with conventional constant voltage welding sources. The current or heating is controlled by the effective resistance or resistance per length, which resistance is controlled by varying the cross sectional area of each segment along the longitudinal length of the segment. This type of solid wire has the advantage that it is easily made by simply connecting metal units together to form a wire having a series of narrow regions along the length of the wire creating quantized segments along the length of the wire. Such a wire can be formed at the manufacturing facility making the solid wire or in a device adjacent to the wire feeder at the welding station, which is often a robotic welding station. By using a solid welding wire having quantized spaced segments along the longitudinal length of the wire, pulsed arc welding can be coordinated so that the pulse frequency and the wire feed rate provide a quantized segment at the time of each current pulse. This coordination stabilizes the pulsed mode transfer so that a single droplet detachment is achieved with each current pulse to optimize the welding characteristics in ways well known in the welding art. The electrode is heated by current passing through the wire. The resistance of the wire has a direct effect on the heating. Thus, by varying the cross section area of the solid wire, the effective resistance or resistance per length is increased in regions having a smaller cross section area and the current is decreased when a constant voltage is applied to the welding process. This adjustment of resistance controls the heating of the advancing welding wire in a manner determined by the cross sectional area and length of each quantized segment of the wire. By using the present invention, the resistance per length of wire is higher than with a solid wire with a uniform cross sectional area. This is an advantage at high deposition rates because the heat input into the workpiece per unit weight of wire can be reduced to extend the stable range of the constant voltage process. By reducing the cross sectional area of the metal along the length of the wire, the resistance per length of the wire can be modified in a tailored fashion. The shape of the solid metal wire can be a variety of other configurations which causes the cross sectional area to reduce in a certain area of each quantized segment and, thus, vary the resistance of the solid wire along the length of each quantized segment. The solid metal wire can be provided with fluxing, filling and/or alloying agents, such that the agents are carried within the narrow regions of the wire without affecting the outer diameter of the metal wire. Electrical contact is maintained at the outer portions of the quantized segments. By adjusting the relative length of the quantized segments and the volume of the narrow region in each quantized segment, the desired amount of fluxing or alloying agents can be provided per length of the advancing solid metal welding wire. Such solid wire has the advantages of standard solid wire with the added advantage of a flux cored or metal cored wire. To protect the fluxing, filling or alloying agents in the space created by the narrow regions, another aspect of the invention includes the use of a metal sheath around the metal electrode. This sheath can be steel or copper to enhance electrical conduction from the electrical contact in the welding equipment to the advancing solid metal welding wire. Thus, moisture contamination and physical damage to the fluxing, filling or alloying agents is inhibited. The sheath or jacket can be mechanically wrapped around the wire having spaced quantized segments by using a standard spiral wrapping technique. The sheath or jacket can be placed around the wire and drawn or rolled with the wire, using techniques similar to those employed in conventional cored wired manufacturing techniques. The sheath or jacket can also be provided by a plating technique or a plasma spray technique so long as the sheath or jacket around the quantized segments is electrically conductive. Indeed, such a sheath or jacket can be placed around the quantized segments forming the solid metal welding wire without the use of filling agents merely to enhance the electrical characteristics, or appearance, of the advancing metal wire stored on a spool for use in an automatic or semi-automatic electric arc welding process.

Such solid wire has the advantages of standard solid wire with the added advantage of a flux cored or metal cored wire.

In accordance with the present invention, there is provided a welding wire for use in electric arc welding wherein the welding wire has an effective outer diameter and comprises a length of solid metal formed into a series of distinct quantized segments, each having a selected volume and a varying cross-sectional area. By controlling the cross-sectional area along the length of the wire, the resistance per length of welding wire can be changed to control the welding process so that a lesser amount of current will be needed to deposit a given amount of molten metal.

In accordance with another aspect of the present invention, the metal wire includes fluxing, filling or alloying agents in the narrow regions of the wire and a metal sheath is placed about the metal wire to protect the fluxing, filling or alloying agents in the narrow regions. This sheath is preferably steel or copper and is used to enhance electrical conduction from the electrical contact in the welding equipment to the advancing solid metal welding wire. Furthermore, the sheath inhibits or prevents moisture contamination, oxidation and physical damage to the fluxing, filling or alloying agents. The sheath or jacket can be mechanically wrapped around the wire having spaced quantized segments by using a standard spiral wrapping technique. The sheath or jacket can be placed around the wire and drawn or rolled with the wire, using techniques similar to those employed in conventional cored wired manufacturing techniques. The sheath or jacket can also be provided by a plating technique or a plasma spray technique so long as the sheath or jacket around the quantized segments is electrically conductive. Indeed, such a sheath or jacket can be placed around the quantized segments forming the solid metal welding wire without the use of filling agents merely to enhance the electrical characteristics, or appearance, of the advancing metal wire stored on a spool for use in an automatic or semi-automatic electric arc welding process.

In accordance with yet another aspect of the present invention, each quantized segment of the wire has generally the same volume of metal, and are positioned generally uniformly along the length of the wire. The narrow regions may be filled with a fluxing agent, alloying metal powder or other constituents to control the metallurgy and fluxing characteristics of the metal wire while maintaining the advantage of a solid metal arc welding wire. In one preferred embodiment, the solid metal wire is formed by connecting together a plurality of metal balls and/or metal disks. The metal balls and/or disks may have a variety of shapes and sizes. The narrow region of such a wire is generally adjacent to the point the metal balls and/or disks are connected together. In one particular embodiment, spherical metal balls are used to form the wire. In one specific embodiment, the size of the spherical metal balls are generally the same along the length of the wire. In another specific embodiment, the size of the spherical metal balls varies along the length of the wire. In another particular embodiment, metal disks are used to form the wire. In one specific embodiment, the metal disks have a generally circular cross-sectional shape.

In accordance with still another aspect of the present invention, the quantized distinct metal segments of the wire have a maximum cross sectional area essentially defining the effective outer diameter of the solid metal welding wire while the narrow regions of the wire have a cross sectional area that is less than the maximum cross-sectional area of the wire.

In accordance with a further aspect of the present invention, there is provided a method of producing a solid welding wire for electric arc welding, which method comprises the steps of forming individual metal balls and/or metal disks and subsequently connecting the metal balls and/or metal disks together to form a solid metal wire which has a varying cross-sectional area along the length of the wire and a series of distinct metal segments each having a selected volume.

In accordance with still a further aspect of the invention, this method includes the step of depositing granular flux into the narrow regions of the wire and/or depositing powder alloying metal into the narrow regions of the wire. In this manner, the narrow regions can control the even distribution of alloying agents, filling agents and/or fluxing agents along the length of the solid welding wire, without requiring the use of a cored wire concept. The method also contemplates the further implementation of an aspect of the invention wherein a metal sheath of steel or other conductive material is placed around the solid metal welding wire.

By using the invention, the series of distinct quantized metal segments can have effective resistance of the solid metal welding wire accurately controlled by adjusting the relationship of the position of the narrow regions.

In accordance with another aspect of the present invention there is provided a method of controlling the resistance per length of a solid metal welding wire used for electric arc welding including the steps of providing a solid metal welding wire having a series of narrow regions in the wire at spaced locations whereby the resistance per length at the narrow regions is greater than the resistance per length of the wire between the narrow regions and controlling the size of the narow regions to control the overall resistance per length of the wire. This method is further modified by including the step of controlling the volume of metal in each quantized segment.

The primary object of the present invention is the provision of a solid metal welding wire, which wire has a series of distinct, quantized segments wherein each segment includes a varying cross sectional area.

Another object of the present invention is the provision of a solid metal wire, as defined above, which solid metal wire can be produced from a plurality of metal units that are joined together at the manufacturing facility or adjacent the wire feeding device in the welding area.

Still another object of the present invention is the provision of a solid metal wire, as defined above, which enables improved control of the transfer of molten wire to the weld.

Yet another object of the present invention is the provision of a solid metal wire, as defined above, which enables increased heating of the wire as compared to conventional wires.

Yet another object of the present invention is the provision of a solid metal welding wire, as defined above, which wire has improved arc stability and controlled heat input. The wire can greatly facilitate pulse arc welding in a constant voltage welding process.

Still a further object of the present invention is the provision of a solid metal welding wire, as defined above, which wire can be produced to have a controlled resistance per length greater than the resistance per length of a metal wire of the same diameter.

A further object of the present invention is the provision of a solid metal welding wire, as defined above, which wire can be produced to control the resistance of the wire stick out per unit volume of wire directed to the workpiece.

Another object of the present invention is the provision of a solid metal welding wire, which wire has a greater resistance per length than a solid wire of the same diameter. This object is an advantage at very high deposition rates due to a reduced heat input to the workpiece per unit length of wire, thus extending the stable range of a constant voltage process.

Still a further object of the present invention is the provision of a solid metal welding wire, as defined above, which welding wire can have controlled resistance per unit length or controlled resistance of the stick out merely by utilizing a series of narrow regions defining the distinct quantized segments of the wire.

Another object of the present invention is the provision of a solid metal welding wire, as defined above, which welding wire can be coordinated with a pulse welding process so that a quantized segment of the wire is provided to the arc of the welding process simultaneously with each current pulse.

Still another object of the present invention is the provision of a solid metal welding wire, as defined above, which produces higher deposition rates than convention wires.

Yet another object of the present invention is the provision of a solid metal welding wire, as defined above, which reduces spatter and produces less fumes and soot there forming a cleaner weld than conventional wires.

A further object of the present invention is the provision of a solid metal welding wire, as defined above, which welding wire can be provided with fluxing, filling and/or alloying agents that can be carried with the wire while maintaining the solid metal characteristics of the welding wire. In addition, the wire of the present invention can be provided with an outer metal sheath to hold the fluxing, filling or alloying agents and/or to increase the conductivity to the advancing metal welding wire during the welding process.

Another primary object of the present invention is the provision of a method of producing a welding wire for electric arc welding, which method forms a series of narrow regions in the wire so that the wire can accept fluxing, filling and/or alloying agents and can have controlled resistance per length of wire.

Another object of the present invention is the provision of a method as defined above, which method can use a standard MIG welding wire and can be performed at a relatively low cost.

These and other objects and advantages will become apparent from the following description taken together with the accompanying drawings.

PREFERRED EMBODIMENT OF THE INVENTION

Figure 1:
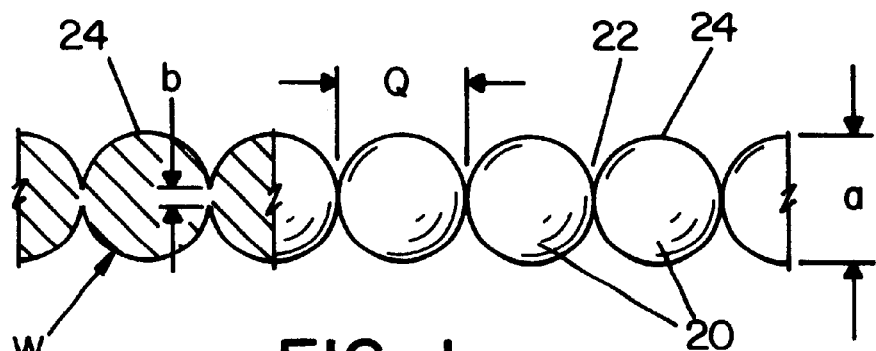
FIG. 1 is a side elevational view showing a solid metal welding wire formed of metal balls constructed in accordance with the present invention.

Referring now to the drawings, wherein the showings are for the purpose of illustrating a preferred embodiment of the present invention and not for the purpose of limiting same, FIG. 1 illustrates a welding wire W constructed in accordance with the present invention is shown. This wire has a series of distinct, quantized segments Q which are defined by each spherical metal ball 20. Each narrow region 22 of the quantized segment Q is located between each of the metal balls. The narrow region 22 is positioned inward of cylindrical surface 24 for welding wire W. Cylindrical surface 24 is the surface of metal ball 20 at the maximum diameter a of the metal ball which corresponds to the diameter of wire W. As can be appreciated, quantized segments Q and the narrow region 22 can take a variety of shapes and sizes. The maximum diameter of the quantized segments determines the cylindrical surface 24 of wire W. The narrow region 22 of the quantized segments has a maximum diameter that is less than diameter a and the minimum diameter of the narrow region is shown as diameter b. As can be appreciated, the diameter of metal ball 20 can be varied to change the size of the quantized section and the size of the narrow region 22. The resistance per length of wire W is increased by narrow regions 20. The relationship between the size of segment Q and the size of narrow region 22 determines the change, or modification, in the resistance per length of wire W over the resistance per length of a wire W having the diameter a. Thus, narrow regions 22 have two overall functions. The narrow regions separate wire W into a series of quantized segments Q each having essentially the same volume of metal. The narrow regions also increase the resistance through wire W so that the effective resistance per length of wire W is controlled by the contour, size and configuration of the narrow regions 20. Thus, narrow regions 20 are used to control the effective resistance of wire W, whereas the quantized segments Q provide controlled droplet transfer of molten metal from wire W during the arc welding process. As can be seen, a variety of dimensions can be provided for segments Q and narrow region 20 to accurately control the resistance and welding characteristics of solid wire W. However, wire W still functions as a solid welding wire. The quantizing of segments on the solid welding wire and the control of resistance through the wire is unique and forms the advantages of the invention, as previously discussed.

Figure 2:
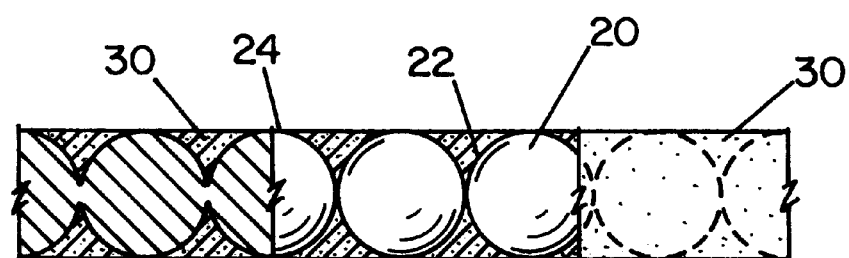
FIG. 2 is a side elevational sectional view showing a solid metal welding wire of FIG. 1 with the narrow regions filled with alloying, filling and/or fluxing agents.
Figure 3:
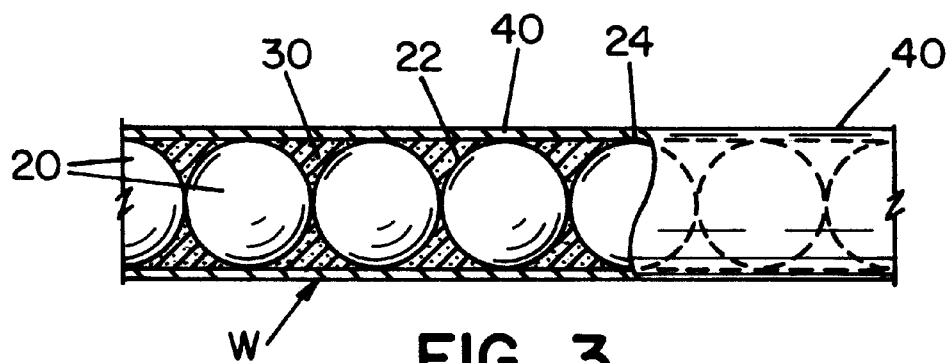
FIG. 3 is a side elevational sectional view showing a solid metal welding wire of FIG. 1 with the narrow regions filled with alloying, filling and/or fluxing agents with an outer metal sheath over the metal welding wire.

In the preferred embodiment shown in FIG. 1, wire W is formed by a plurality of generally spherical metal balls that are connected together. The region between the generally spherical metal balls 20 and inward of wire cylindrical surface 24 is narrow region 22. The series of spherical balls forms a narrow region that has a generally "V" shaped cross-sectional shape as shown in FIG. 1. By using this, or any similar construction of wire W, it is possible to load the solid welding wire W with fluxing agents, filling agents, and/or alloying agents. As shown in FIG. 2, narrow regions 22 are filled with a fluxing agent, filling agent and/or alloying agent 30 which is normally granular in nature and formed into a paste. The paste is easily deposited in narrow regions 22 and remains in narrow regions 22. Thus, the amount of flux directed to the arc in the welding process is controlled by the size and axial spacing of narrow regions 22. The wire still has the characteristics of a solid metal wire, which characteristic produces arc stability, while still having the ability of carrying a flux of controlled quantities to the arc during the welding process. In the past, use of flux, fill and/or alloy involved a cored welding wire, which wire did not have the beneficial characteristics of a solid wire. There are stick electrodes which have flux, fill and/or alloy agents coated on the outside of the electrodes. Such outside coating could not be used for welding wire of the type to which the present invention is directed. In some instances it may be advisable to cover narrow regions 22 with an appropriate metal sheath 40, as illustrated in FIG. 3. The sheath can be a metal sheath as used in cored wire. As can be appreciated the sheath can be made of a variety of metals such as a copper sheath to enhance the electrical contact with wire W in the welding equipment. By using sheath 40, the flux, fill and/or alloy 30 is secured between the inner surface of the metal sheath and the narrow regions. As can be appreciated, the metal sheath can be use on the wire without the use of flux, fill and/or alloy in narrow regions 22.

Figure 4:
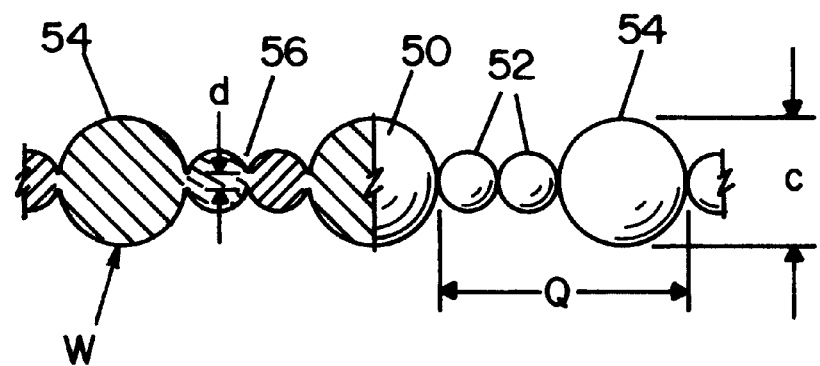
FIG. 4 is a side elevational view showing an alternate embodiment of a solid metal welding wire formed of varying sized metal balls constructed in accordance with the present invention.

Referring now to FIG. 4, an alternate embodiment of wire W is shown. Wire W is formed from two different sized metal balls 50, 52. Metal ball 50 is shown to have a larger diameter than metal ball 52. Quantized segment Q is the combination of one metal ball 50 and two metal balls 52. The narrow region is the region between two metal balls 50 and inward of cylindrical surface 54 for welding wire W. Cylindrical surface 54 is the surface of metal ball 50 at the maximum diameter c of the metal ball which corresponds to the diameter of wire W. The maximum diameter of the quantized segments determines the cylindrical surface 54 of wire W. The narrow region 56 of the quantized segments has a maximum diameter that is less than diameter c and the minimum diameter of the narrow region is shown as diameter d. The resistance per length of wire W is increased by narrow regions 56. The relationship between the size of segment Q and the size of narrow region 56 determines the change, or modification, in the resistance per length of wire W over the resistance per length of a wire W. As shown in FIG. 4, wire W is formed by a plurality of generally spherical balls having varying sizes and which metal balls that are connected together. The narrow region 56 is formed by two smaller sized spherical metal balls 52. As can be appreciated, narrow region 56 can alternatively be formed by a single metal ball 52, three of more metal balls 52, or a plurality of varying sized and shaped metal balls. By using this, or any similar construction of wire W, it is possible to load the solid welding wire W with fluxing agents, filling agents, and/or alloying agents. The wire can also include a metal sheath to cover narrow regions 56.

Figure 7:
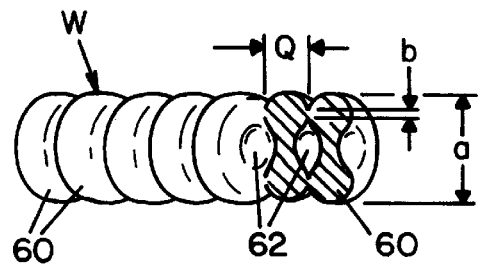
FIG. 7 is a perspective view showing an alternate embodiment of a solid metal welding wire formed of metal disks constructed in accordance with the present invention.
Figure 8:
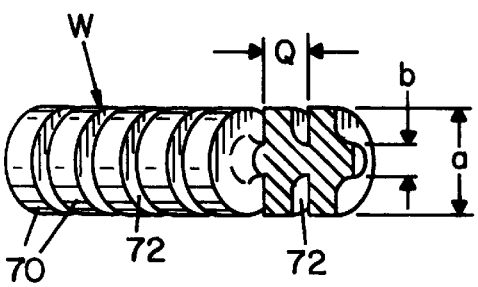
FIG. 8 is a perpsective view showing another alternate embodiment of a solid metal welding wire formed of metal disks constructed in accordance with the present invention.

Referring now to FIGS. 7 and 8, another alternate embodiments of wire W are shown. In FIG. 7, wire W is formed from a plurality of metal disks 60. Positioned between the disks is narrow region 62. Each metal disk 60 represents a quantized segment Q. Referring now to FIG. 8, wire W is also formed by a plurality of disks 70 that are shaped differently from the metal disks in FIG. 7. Positioned between the disks is a narrow region 72. Each metal disk 60 represents a quantized segment Q. The wires in FIGS. 7 and 8 can be loaded with fluxing agents, filling agents, and/or alloying agents in the narrow regions. The wire can also include a metal sheath to cover narrow regions.

The disclosure of FIGS. 1, 2, 3, 4, 7 and 8 show that a variety of structures can be used for forming wire W and closing the narrow regions and/or loading narrow regions with several additional constituents, without compromising the solid wire characteristics of wire W or the resistance controlling characteristics of the wire. The components of the solid metal wire can be connected together in a number of different manners; i.e. adhesives, bonding agents, soldering, welding, metal or plastic sleeves, and the like. The metal used to form wire W is selected for a particular application. The metal sheath, fluxing agents, filling agents and/or alloying agents, if used, are also selected based upon the particular application.

As shown in FIG. 1, electrical contact is maintained with surface 24 and the ratio of diameter a to diameter b can be adjusted to control the ratio of the quantity of materials 30 with respect to the volume of wire W. Sheath 40 prevents moisture and other contaminations from entering narrow region 22 and maintains agents 30 in place. In practice, when sheath 40 is employed, it is preferably wrapped around the quantized wire as a metal foil jacket utilizing a spiral wrapping technique. Other methods of applying the sheath include forming the sheath mechanically about the solid wire, plating the sheath on the solid wire, plasma or metal spraying the sheath on the solid wire, etc.

As illustrated in FIGS. 1, 4, 7 and 8, the narrow region of the quantized segments can have a variety of shapes. Thus, "narrow region" indicates the existence of a reduced volume inward of the maximum diameter of the wire, but not necessarily the procedure for accomplishing that decreased size of the volume and the increased resistance in the quantized segments Q.

Figure 5:
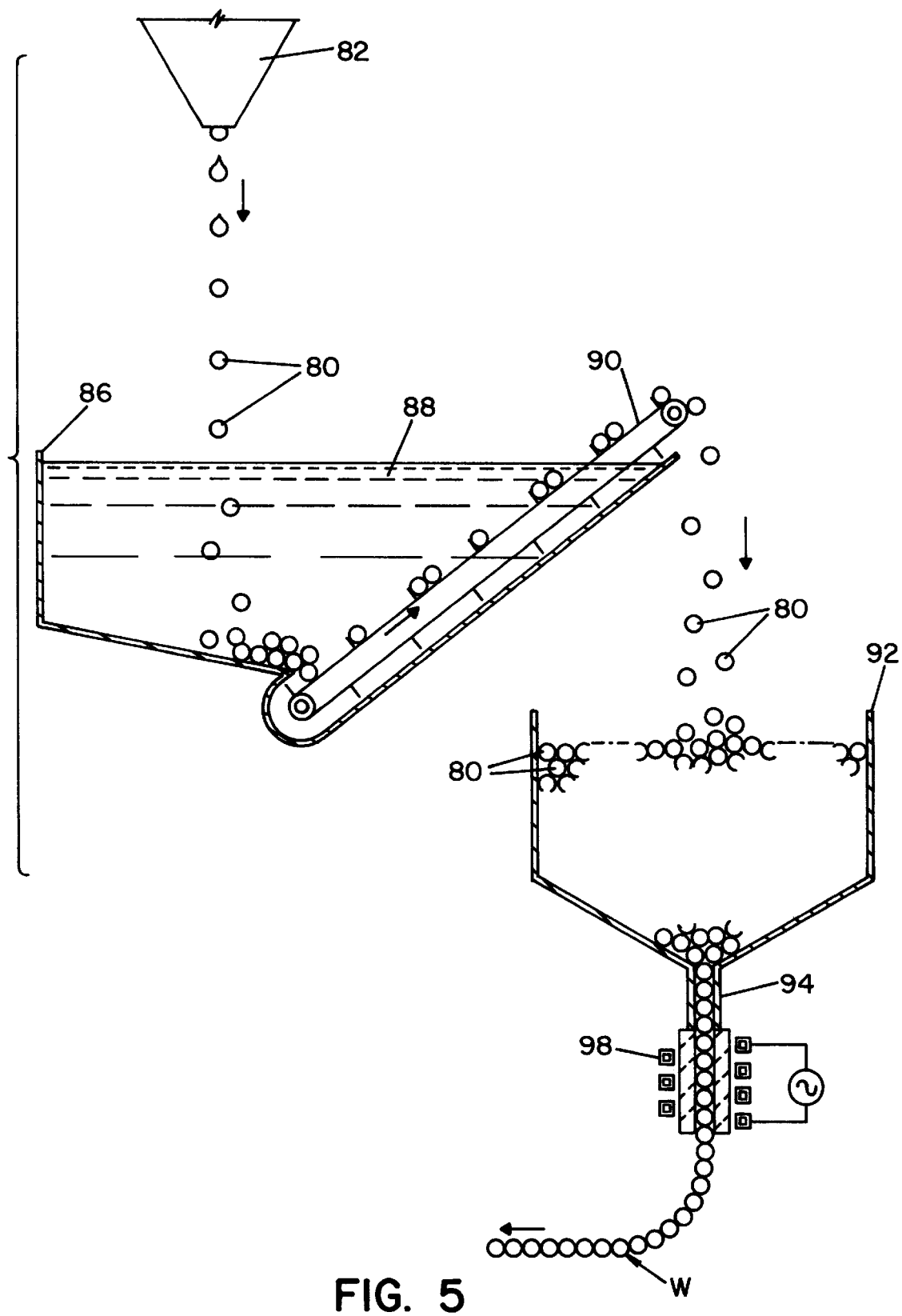
FIG. 5 is a side elevational view schematically illustrating a procedure for forming the solid metal welding wire of FIGS. 1 and 4.

FIG. 5 illustrates one procedure for forming wire W as illustrated in FIGS. 1 and 4. FIG. 5 illustrates molten metal flowing from drip nozzle 82. The molten metal flows from the drip nozzle and into a cooling liquid such as water. As the molten metal flows from the drip nozzle, the surface tension of the molten metal causes the metal to form into a generally spherical ball 80. The size of the nozzle opening and the flow rate of the molten metal through the nozzle is controlled to form the desired size of the metal balls. The generally spherical molten metal balls 80 are rapidly cooled into a solid state upon contacting cooling liquid 88 in cooling vessel 86. The solid generally spherical metal balls remain submerged in the cooling liquid until being conveyed into storage vat 92 by conveyor 90. The solid metal balls directed into a guide channel 94 and are connected together by an induction heater 98. The formed wire W is then wound for storage, and/or further process by adding agents in the narrow regions and/or applying a metal sheath. A standard MIG wire W could be provided to the welding locations and the quantized segments Q would be formed on the wire at that site. This is an advantage of the present invention and allows customized production of a solid welding wire having quantized segments Q.

Figure 6:
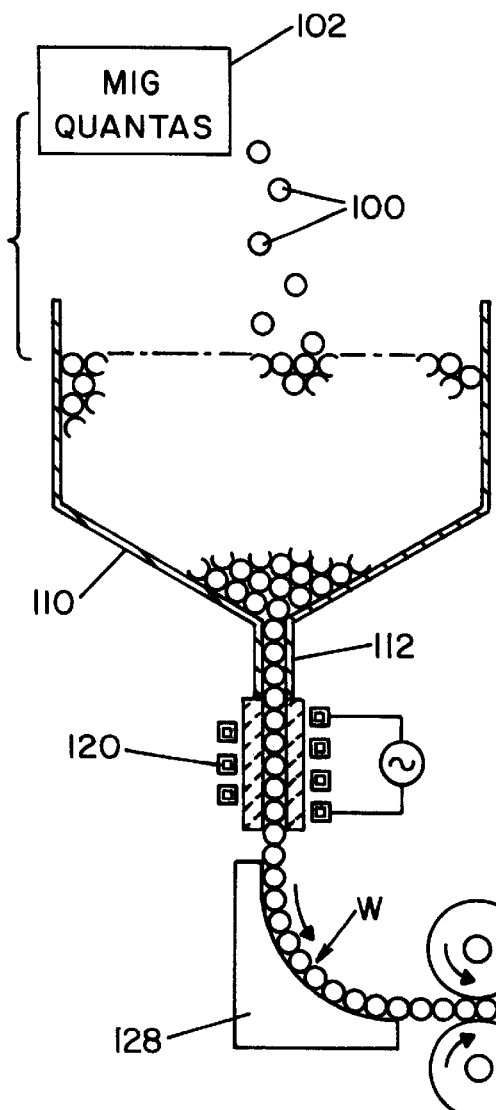
FIG. 6 is a side elevational view schematically illustrating an alternative procedure for forming the solid metal welding wire of FIGS. 1 and 4 and subsequently feeding the wire into a welding apparatus.

FIG. 6 illustrates an alternate method of forming wire W. Preformed spherical metal balls 100 are fed from a box of metal balls 102 and into a welding vat 110. The metal balls proceed into a guide channel 112 and are connected together by inductor 120 to form wire W. Wire W is directed to two sets of guide wheels 130 by guide 128. As can be appreciated, additional or fewer sets of guide wheels can be used. The guide wheels may also be used to control the speed of the wire W to the workpiece WP, smooth the surface of the wire, elongate or otherwise reshape the wire, and/or add components the wire. The guide wheels move wire W into and through welding nozzle 140 to weld workpiece WP.

Figure 9:
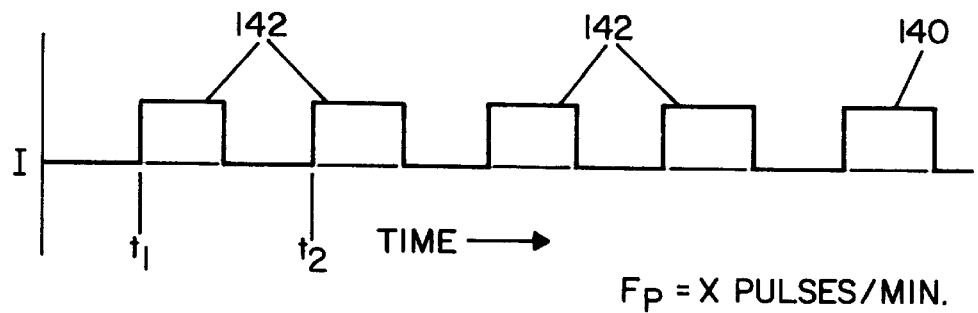
FIG. 9 is a composite view showing the coordination between current pulses in a pulse arc welding process and the mechanical aspects of the welding process explaining the relationship between the pulses and the quantized segments of a welding wire constructed in accordance with the present invention.
Figure 10:
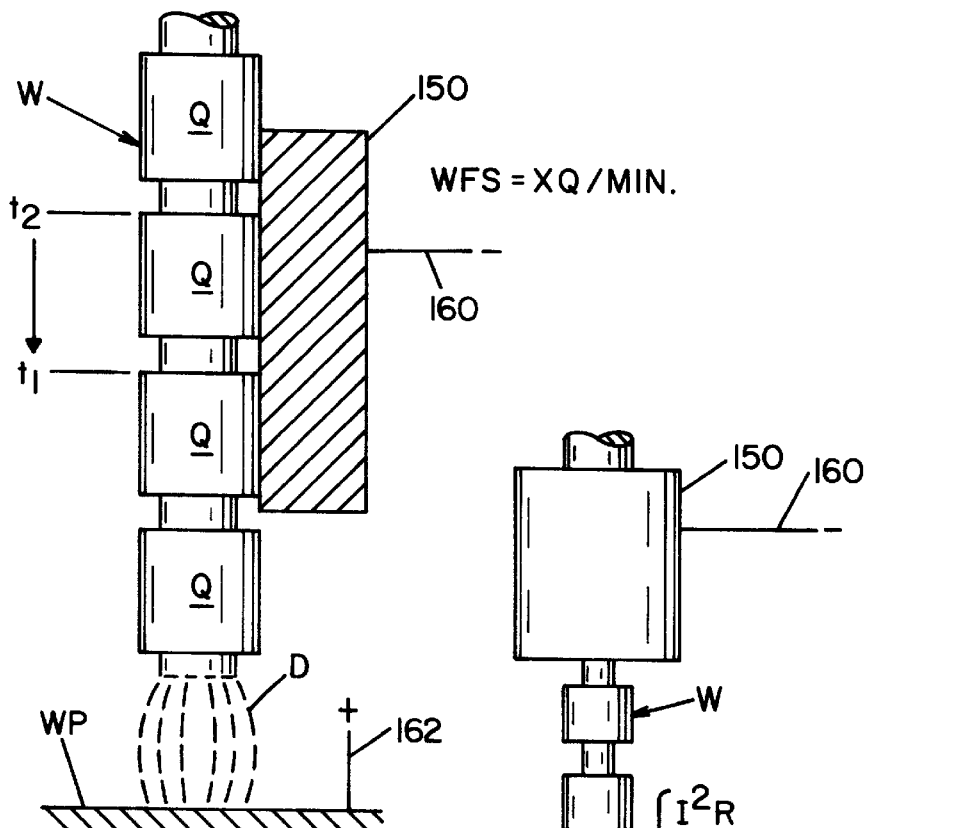
FIG. 10 is a schematic illustration of the welding process showing wire W passing through a contact sleeve as the wire W is melted at arc D by pulses as wire W is moved at a wire feed speed providing a quantized segment Q at the same time as a current pulse.
Figure 11:
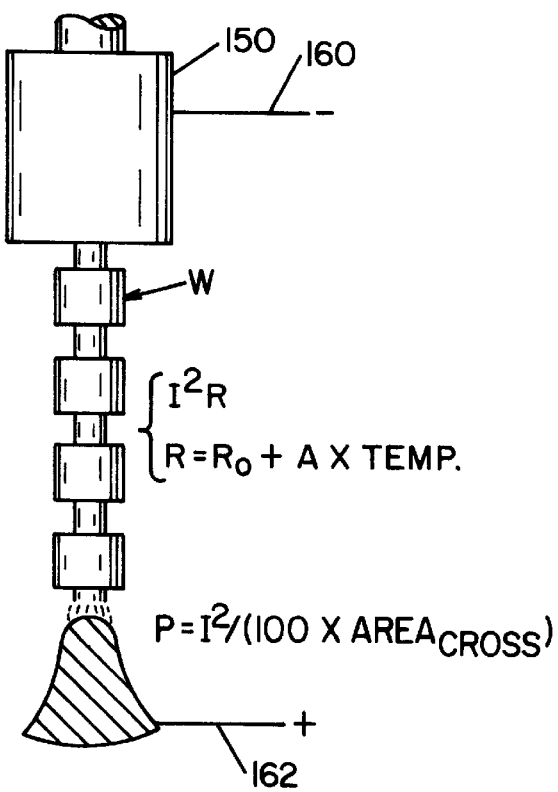
FIG. 11 is a schematic illustration of the welding process showing the resistance through wire W as a function of the cross-sectional area of wire W.

One advantage of a solid welding wire constructed in accordance with the present invention is that it can be coordinated with a pulse welding process, as schematically illustrated in FIG. 9 wherein a series of current pulses 142 from a constant voltage power supply have a time spacing $t_1$ to $t_2$. The pulse frequency of the pulses 142 is a known value, such as X pulses per minute. FIG. 10 illustrates schematically the welding process, wherein wire W is passed through a contact sleeve 150 toward a workpiece WP so that wire W is melted at arc D by pulses from a power supply connected to negative lead 160 and positive lead 162. As pulses 142 are directed through arc D, wire W is moved at a wire feed speed providing a quantized segment Q at the same time as a current pulse 142. The wire feed speed is coordinated with the frequency of the current pulses so that a quantized amount of metal is provided for each pulse to melt during the pulse welding procedure. Referring to FIG. 11, the relationship between the resistance of the wire along a particular length of the wire as a function of the power P supplied to the wire W is shown. The resistance of a section of wire W is a function of temperature and is represented by $R=R_o+A \times Temp$, wherein R is the resistance of the wire, $R_o$ is the resistance of the wire and ambient temperature, A is a constant, and Temp is the temperature about ambient temperature. As can be appreciated, during the melting of the wire, the resistance in the narrow increases due to the reduced cross-sectional area of the wire. The power supplied to the wire is illustrated as being dependant on the cross-sectional area of the wire and is represented by $P=I^2/(100 \times Area_{cross})$, wherein P is the power supplied to the wire, I is the current supplied to the wire and $Area_{cross}$ is the cross-sectional area of the wire. As the cross-sectional area of the wire is reduced, the amount of current to the wire can be reduced while maintaining a constant amount of power to the wire.

The special shape of the wire results in a change in the arc and the resultant weld. The special shape of the wire controls the transfer of the molten wire through the arc by forcing individual droplet transfer. Each droplet is generally of a fixed size and separates from the wire at a generally precise frequency. This type of droplet transfer occurs because the narrow region of the wire melts first. The narrow region has a larger resistance due to its smaller cross-sectional area as compared to the non-narrow region. Therefore, the heating of the narrow region is accelerated because of the larger resistance and resulting higher temperatures during welding. Pinch forces also assist in the droplet transfer. The pinch force is the electromagnetic pressure than constricts the wire during welding. The smaller cross-sectional area at the narrow region produces increased pinch forces, thereby assisting in the detachment of the droplet from the wire and assisting to propel the droplet into the arc. The special shaped wire design results in significant advantages over conventional wire. The special shaped wire welds at higher deposition rates than can be achieved with conventional wire. The special shaped wire requires less energy weld as compared to conventional wire. The reduced energy requirements allows for thinner materials to be welded and the reduction in the amount of distortion of the welded materials. The special shaped wire enhances the STT® process and MIG welding, and increases the deposition rates when welding open root joints such as on pipes. The heat effected zone of the welded materials is reduced when using the special shaped wire thereby resulting in improved mechanical properties of the weld. The use of the special shaped wire also results in cleaner welds due to the generally precise droplet control that results in reduced spatter. The special shaped wire also generated reduced amounts of fumes and soot since the wire is transferred in the form of a droplet instead of being vaporized in the arc. This ability to coordinate specific quantities of metal for each current pulse is an advantage of the present invention. There are other advantages as previously discussed whereby the novel concept of using quantized segments in a solid metal welding wire to produce controlled resistance and superior droplet transfer.

The invention has been described with reference to preferred embodiments and alternates thereof. It is believed that many modifications and alterations to the embodiments discussed herein will readily suggest themselves to those skilled in the art upon reading and understanding the detailed description of the invention. It is intended to include all such modifications and alterations in so far as they come within the scope of the present invention.

Having thus described the invention, the following is claimed:

1. A welding wire for use in electric arc welding, said wire having an effective outer diameter and comprising a solid metal core formed by a plurality of individual metal components that are joined together to form a plurality of distinct segments along the longitudinal length of the metal core, each of said segments including at least one of said metal components and having a non-narrow region and a narrow region, the cross sectional area of said non-narrow region being greater than the cross sectional area of said narrow region, said metal components being connected together by use of adhesives, bonding agents, soldering, welding, metal sleeves and/or plastic sleeves.

2. A welding wire as defined in claim 1, wherein said non-narrow region being generally cylindrical with an outer diameter corresponding to said effective outer diameter of said wire.

3. A welding wire as defined in claim 1, wherein each of said segments having substantially the same volume of solid metal.

4. A welding wire as defined in claim 1, wherein said metal components including a generally spherical metal ball.

5. A welding wire as defined in claim 4, wherein said spherical metal balls vary in diameter.

6. A welding wire as defined in claim 5, wherein at least one of said segments comprising a large spherical metal ball connect to a smaller diameter spherical metal ball.

7. A welding wire as defined in claim 1, wherein said metal components including a metal disk.

8. A welding wire as defined in claim 1, wherein at least one of said narrow regions containing a granular flux.

9. A welding wire as defined in claim 1, wherein at least one of said narrow regions containing an alloying metal powder.

10. A welding wire as defined in claim 8, wherein at least one of said narrow regions containing an alloying metal powder.

11. A welding wire as defined in claim 1, including an outer metal sheath encircling said length of said solid metal.

12. A welding wire for use in electric arc welding, said wire having a solid metal core with an effective outer diameter and comprising a plurality of individual metal components that are joined together to form a plurality of distinct segments along the longitudinal length of the metal core, said segments having a given volume and a maximum cross sectional area generally determined by said effective outer diameter, each of said segments including a non-narrow region and a narrow region, said non-narrow region having a maximum cross-sectional area where the maximum cross sectional area greater than the maximum cross-sectional area of said narrow region.

13. A welding wire as defined in claim 12, wherein said non-narrow region of said segments being generally cylindrical with an outer diameter corresponding to said effective outer diameter of said wire.

14. A welding wire as defined in claim 12, wherein each of said segments having substantially the same volume of solid metal.

15. A welding wire as defined in claim 12, wherein said metal components including a generally spherical metal ball.

16. A welding wire as defined in claim 15, wherein said spherical metal balls vary in diameter.

17. A welding wire as defined in claim 16, wherein at least one of said segments comprising a large spherical metal ball connect to a smaller diameter spherical metal ball.

18. A welding wire as defined in claim 12, wherein said metal components including a metal disk.

19. A welding wire as defined in claim 12, wherein at least one of said narrow regions containing a granular flux.

20. A welding wire as defined in claim 12, wherein at least one of said narrow regions containing an alloying metal powder.

21. A welding wire as defined in claim 12, including an outer metal sheath encircling said length of solid metal.

22. A welding wire for use in electric arc welding, said wire having an effective outer diameter and comprising a solid metal core formed from a plurality of individual metal components that are joined together to form a series of distinct segments along the longitudinal length of the metal core, each segment including a narrow region and a non-narrow region, said non-narrow region having a resistance per length of said segment being less than the resistance per length of said elements of said narrow region.

23. A welding wire as defined in claim 22, wherein said narrow region containing a granular flux.

24. A welding wire as defined in claim 22, wherein said narrow region containing an alloying metal powder.

25. A welding wire as defined in claim 22, including an outer metal sheath encircling said length of solid metal.

26. A welding wire as defined in claim 2, wherein each of said segments having substantially the same volume of solid metal.

27. A welding wire as defined in claim 26, wherein said metal components including a generally spherical metal ball.

28. A welding wire as defined in claim 27, wherein said spherical metal balls vary in diameter.

29. A welding wire as defined in claim 28, wherein at least one of said segments comprising a large spherical metal ball connect to a smaller diameter spherical metal ball.

30. A welding wire as defined in claim 26, wherein said metal components including a metal disk.

31. A welding wire as defined in claim 29, wherein at least one of said narrow regions containing a granular flux.

32. A welding wire as defined in claim 30, wherein at least one of said narrow regions containing a granular flux.

33. A welding wire as defined in claim 31, wherein at least one of said narrow regions containing an alloying metal powder.

34. A welding wire as defined in claim 32, wherein at least one of said narrow regions containing an alloying metal powder.

35. A welding wire as defined in claim 11, wherein at least one of said narrow regions containing an alloying metal powder.

36. A welding wire as defined in claim 34, wherein at least one of said narrow regions containing an alloying metal powder.

37. A welding wire as defined in claim 13, wherein each of said segments having substantially the same volume of solid metal.

38. A welding wire as defined in claim 37, wherein said metal components including a generally spherical metal ball.

39. A welding wire as defined in claim 38, wherein said spherical metal balls vary in diameter.

40. A welding wire as defined in claim 39, wherein at least one of said segments comprising a large spherical metal ball connect to a smaller diameter spherical metal ball.

41. A welding wire as defined in claim 37, wherein said metal components including a metal disk.

42. A welding wire as defined in claim 40, wherein at least one of said narrow regions containing a granular flux.

43. A welding wire as defined in claim 40, wherein at least one of said narrow regions containing a granular flux.

44. A welding wire as defined in claim 42, wherein at least one of said narrow regions containing an alloying metal powder.

45. A welding wire as defined in claim 43, wherein at least one of said narrow regions containing an alloying metal powder.

46. A welding wire as defined in claim 12, wherein said metal components are connected together by use of adhesives, bonding agents, soldering, welding, metal sleeves and/or plastic sleeves.

47. A welding wire as defined in claim 44, wherein said metal components are connected together by use of adhesives, bonding agents, soldering, welding, metal sleeves and/or plastic sleeves.

48. A welding wire as defined in claim 45, wherein said metal components are connected together by use of adhesives, bonding agents, soldering, welding, metal sleeves and/or plastic sleeves.

49. A welding wire as defined in claim 47, including an outer metal sheath encircling said length of solid metal.

50. A welding wire as defined in claim 48, including an outer metal sheath encircling said length of solid metal.

51. A welding wire as defined in claim 23, wherein said narrow region containing an alloying metal powder.

52. A welding wire as defined in claim 51, wherein said metal components are connected together by use of adhesives, bonding agents, soldering, welding, metal sleeves and/or plastic sleeves.

53. A welding wire as defined in claim 52, including an outer metal sheath encircling said length of solid metal.

* * * * *

UNITED STATES PATENT AND TRADEMARK OFFICE
CERTIFICATE OF CORRECTION

PATENT NO. : 6,137,081  
DATED : October 24, 2000  
INVENTOR(S) : George D. Blankenship and Edward A. Enyedy Page 1 of 1

It is certified that error appears in the above-identified patent and that said Letters Patent is hereby corrected as shown below:

<u>Title page,</u>
Item [63], Related U.S. Application Data, delete "Continuation" and insert therefor -- Continuation-in-part --.

Signed and Sealed this

Sixteenth Day of April, 2002

Attest:

JAMES E. ROGAN
*Attesting Officer*   *Director of the United States Patent and Trademark Office*